(12) United States Patent
Wu et al.

(10) Patent No.: US 12,608,788 B1
(45) Date of Patent: Apr. 21, 2026

(54) SYSTEMS AND METHODS FOR DETECTION AND PREDICTION OF COBBLE EVENTS

(71) Applicant: Everguard, Inc., Irvine, CA (US)

(72) Inventors: Yong Wu, Cypress, CA (US); Changsoo Jeong, Rancho Palos Verdes, CA (US)

(73) Assignee: Everguard, Inc., Irvine, CA (US)

( * ) Notice: Subject to any disclaimer, the term of this patent is extended or adjusted under 35 U.S.C. 154(b) by 304 days.

(21) Appl. No.: 18/395,145

(22) Filed: Dec. 22, 2023

Related U.S. Application Data

(60) Provisional application No. 63/476,680, filed on Dec. 22, 2022.

(51) Int. Cl.
| | |
|---|---|
| *G06T 7/00* | (2017.01) |
| *B21C 51/00* | (2006.01) |
| *G06V 10/26* | (2022.01) |
| *G06V 10/764* | (2022.01) |

(52) U.S. Cl.
CPC ............ *G06T 7/0004* (2013.01); *B21C 51/00* (2013.01); *G06V 10/26* (2022.01); *G06V 10/764* (2022.01); *G06T 2207/20081* (2013.01); *G06T 2207/30136* (2013.01); *G06V 2201/06* (2022.01)

(58) Field of Classification Search
None
See application file for complete search history.

(56) References Cited

U.S. PATENT DOCUMENTS

| | | | | |
|---|---|---|---|---|
| 2004/0105001 | A1* | 6/2004 | Chang .................. | G01N 21/952 348/92 |
| 2006/0002605 | A1* | 1/2006 | Chang .................. | G01N 21/952 382/141 |
| 2008/0063426 | A1* | 3/2008 | Chang .................. | G01N 21/952 399/98 |
| 2021/0109497 | A1* | 4/2021 | Man .................... | G06Q 10/0635 |
| 2023/0127651 | A1* | 4/2023 | Cella ..................... | G06N 3/045 705/7.11 |
| 2025/0042039 | A1* | 2/2025 | Sandri ................... | B25J 11/005 |
| 2025/0197173 | A1* | 6/2025 | Chowdhury ........... | G06V 20/70 |

* cited by examiner

*Primary Examiner* — Delomia L Gilliard
(74) *Attorney, Agent, or Firm* — Esplin & Associates, PC

(57) ABSTRACT

Systems and methods for monitoring an industrial process are disclosed. The method may include receiving image information conveying a time-ordered series of images of the industrial process; generating segmentation maps for the images; identifying individual sets of the images that depict cobble event candidates; determining whether the cobble event candidates are actual cobble events; and generating control signals to remediate actual cobble events.

20 Claims, 7 Drawing Sheets

300

352

330

303

310b

310a

340

341

350

Cobble occurs when material is on the same line in the bounding box range

Material (Steel Bar)

Bounding Box

Normal

Cobble

760

710

770b

770a

Case 1    Case 2

Cause of occurrence : ssw* cycle error
* SSW operates below 42mm in diameter

700

SYSTEMS AND METHODS FOR DETECTION AND PREDICTION OF COBBLE EVENTS

PRIORITY

This application claims priority of U.S. Provisional Patent Application No. 63/476,680, filed Dec. 22, 2022, which is incorporated by reference into the present disclosure, in its entirety.

FIELD OF THE DISCLOSURE

The present disclosure relates to systems and methods for detection and prediction of cobble events.

BACKGROUND

Cobble events in steel mills may be dangerous, destructive, and expensive to handle. A cobble event may occur when a steel bar is being hot rolled to reduce its thickness. If the steel bar is not provided to the hot rollers at a precise temperature and pressure, the steel bar may exit from its roller path, forming a cobble. The cobble may continue to grow until the steel bar has been completely processed by the rollers before it may finally be cleaned up. Trying to stop a steel cobble as it is happening, on the other hand, could cause damage to steel mill equipment.

SUMMARY

In steel mills, molten steel may be shaped by rollers while being transported through the mill. When a roller undergoes irregularities or malfunctions, the molten steel may deviate from its path as it is being transported, causing jams. Being high-temperature material, the molten steel may coil up, create loops, and/or spill over the roller line. This phenomenon may be referred to as a steel mill cobble or steel cobble (herein interchangeably referred to as a "cobble"). Steel cobbles may be highly dangerous, due to the high temperature and movement speed of the molten material. Disclosed herein is a system for steel mill cobble detection, mitigation, and prevention. The system may use computer vision and machine learning for early detection of cobble or conditions that may lead to cobble. Once cobble is detected, the system may generate alerts to nearby workers in addition to controlling steel mill equipment to reduce hazards caused by the cobble event. The system may also constantly monitor the state of one or more rollers using computer vision to build predictive models for cobble prevention. In some cases, models herein may be capable of predicting an impeding cobble event prior to occurrence of the hazardous cobble event and may generate alert to prevent the event from happening.

The present disclosure provides methods and systems which may apply in other contexts to safety management in a hazardous environment. For example, the systems and methods disclosed herein may apply in a remote workplace, an indoor workplace, an outdoor workplace, a place where hazardous work is conducted such as an industrial environment, a construction site, or manufacturing plant. The present disclosure may provide situational awareness functionality that may be used in various contexts, including construction site, shipping, mining, healthcare, manufacturing environments and various other industries. By virtue of the systems and methods described herein, risks in metal manufacturing environments may be reduced. For example, loss of material and risks to workers may be reduced due to early detection and/or prediction of cobble events. Early detection and/or prediction of cobble events may enable the cobble events to be controlled before increasing in magnitude.

One aspect of the present disclosure relates to a system configured to detect and predict occurrences of cobble events in an industrial environment in which hot metal is being processed. The system may include an image sensor. The image sensor may be configured to capture image information conveying a time-ordered series of images of the industrial environment that depict at least one area of the industrial environment through which hot metal is being moved. The system may include one or more hardware processors configured by machine-readable instructions. The processor(s) may be configured to receive the image information captured by the image sensor. The processor(s) may be configured to generate segmentation maps for individual ones of the images with a first machine-learning model. The individual segmentation maps may indicate the portion or portions of the individual images that depict hot metal moving through the industrial environment. The processor(s) may be configured to identify individual ones of the images and/or individual sets of individual ones of the images that depict cobble event candidates. By way of non-limiting example, one or more images may be identified as an individual cobble event candidate. In some implementations, such identification may be done by analyzing the portion or portions of the individual images indicated by the segmentation maps as depicting hot metal moving through the industrial environment.

The processor(s) may be configured to provide an image or a set of images to subsequent machine-learning model(s) as input. The term "second machine-learning model" may be used to refer to one or more subsequent machine-learning models. The second machine-learning model may be configured to determine whether the image or the set of images depict an actual cobble event or a false positive cobble event. Providing the image or the set of images to the second machine-learning model as input may be responsive to identification of the image or the set of images as a cobble event candidate. The processor(s) may be configured to generate control signals for one or more pieces of equipment present in the industrial environment. By way of non-limiting example, the control signals may cause the one or more pieces of equipment to modify operation to remediate the actual cobble event and/or provide notification of the actual cobble event. By way of non-limiting example, the control signals may be generated responsive to determining the input image or set of images depicts an actual cobble event.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
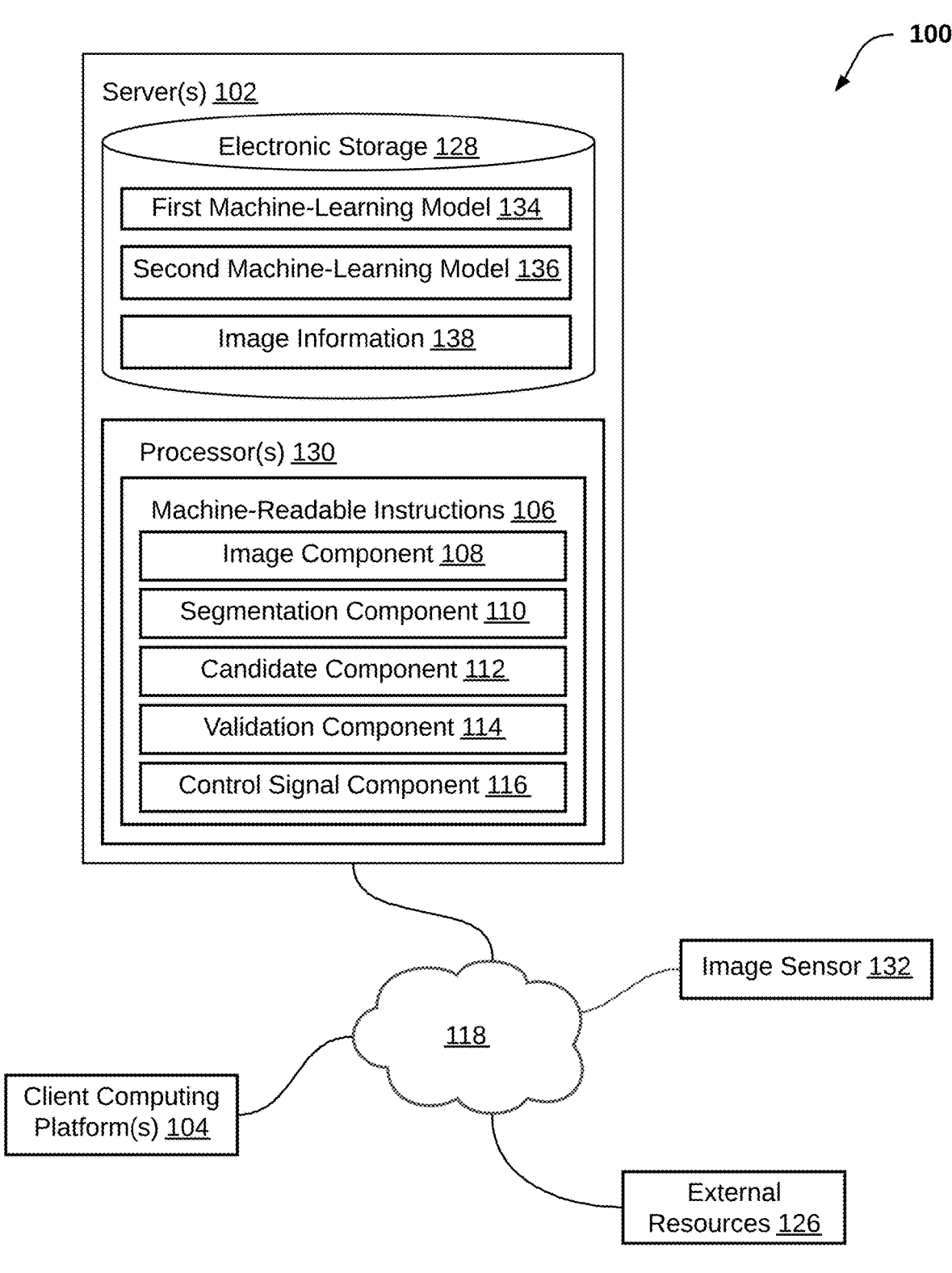
FIG. 1 illustrates a system configured to detect and predict occurrences of cobble events in an industrial environment in which hot metal is being processed.

FIG. 1 illustrates a system 100 configured to detect and predict occurrences of cobble events in an industrial environment in which hot metal is being processed, in accordance with one or more implementations. In some cases, the industrial environment may be dynamically changing (e.g., a construction site). In some cases, the industrial environment may be a remote area with limited wireless Internet or cellular network access, or an area without connection to a wide area network ("WAN") or an inter-network (e.g., the Internet). In some implementations, the processing of the hot metal may include metal manufacturing. Metal manufacturing may include metal making, casting, rolling, and/or other methods of metal manufacturing. Rolling may comprise hot or cold rolling. The metal may be steel. In some embodiments, the metal may be iron, aluminum, titanium, copper, cadmium, nickel, chromium, and/or another metal. The metal may be an alloy, such as carbon alloy or brass. The metal may be in various geometrical shapes, such as bars, tubes, and sheets.

A cobble event may occur when a molten metal bar is being hot rolled to change its shape. If the molten bar is not being provided to the rollers at a precise speed and pressure, it may deviate from its rolling path. This may cause the molten steel to exit the production line, creating a hazardous environment and potentially causing severe damage partially or completely to personnel and/or equipment. Removing cobbled steel bars from the production line may be difficult and time-consuming, causing blockages or delays in production.

A cobble event may refer to a situation that may produce a collision between two hot or molten metal bars. Such a cobble event may occur when two metal bars that are approaching one another are less than a threshold angle apart from one another (laterally) when they are a particular distance from one another. A process to detect such cobble may execute while a particular steel product is being manufactured.

In some implementations, system 100 may include one or more servers 102. Server(s) 102 may include non-transitory electronic storage 128. By way of non-limiting example, non-transitory electronic storage 128 may be configured to store first machine-learning model 134, second machine-learning model 136, image information 138, and/or other information. In some implementations, first machine-learning model 134 and/or second machine-learning model 136 may be trained machine-learning models. By way of non-limiting example, first machine-learning model 134 and second machine-learning model 136 may be trained with the same method, different methods, and/or similar methods.

In some embodiments, first machine-learning model 134 and second machine-learning model 136 may have been trained using a data set and a target in a manner that might be described as supervised learning. In these embodiments, the data set may be conventionally divided into a training set, a test set, and (in some cases), a validation set. A target may be specified that contains the correct classification of each input value in the data set. For example, a set of steel mill image information may be repeatedly presented to first machine-learning model 134 and/or second machine-learning model 136, and for each sample presented during training, the output generated by first machine-learning model 134 and/or second machine-learning model 136 may be compared with the desired target. The difference between the target and the set of input samples is calculated, and first machine-learning model 134 and/or second machine-learning model 136 may be modified to cause the output to more closely approximate the desired target value. In some embodiments, a backpropagation algorithm may be utilized to cause the output to more closely approximate the desired target value. After a large number of training iterations, first machine-learning model 134 and/or second machine-learning model 136 may closely match the desired target for each sample in the input training set. Subsequently, when new input information (i.e., input information not used during training) is presented to first machine-learning model 134 and/or second machine-learning model 136, first machine-learning model 134 and/or second machine-learning model 136 may generate an output classification value indicating into which of the categories the new sample is most likely to fall. First machine-learning model 134 and/or second machine-learning model 136 may be said to be able to "generalize" from its training to new, previously unseen input samples. This feature of first machine-learning model 134 and/or second machine-learning model 136 may allow such models to be used to classify almost any input information which has a mathematical relationship to the category to which it should be assigned.

In some implementations, first machine-learning model 134 and/or second machine-learning model 136 may have been trained using simulated steel mill image information. Simulated steel mill image information and/or other simulated input information may be used if there are insufficient quantities of appropriate information available for training first machine-learning model 134 and/or second machine-learning model 136 to a desired accuracy. In some embodiments, a mixture of real-world and simulated training data may be used to train first machine-learning model 134 and/or second machine-learning model 136. For example, a simulated and non-simulated training data may be used, utilizing a mixture of steel mill image information and simulated steel mill image information to meet training data requirements.

In some embodiments unsupervised learning and/or self-supervised learning may have been used to train first machine-learning model 134 and second machine-learning model 136 to use input information such as, for example, steel mill image information and output, for example, a detected cobble event. Unsupervised and self-supervised learning, in some embodiments, may include feature extraction on the input information. Extracted features may be used for visualization, for classification, for subsequent supervised training, and more generally for representing the input for subsequent storage or analysis. In some cases, each training case may consist of a plurality of steel mill images.

K-means clustering, mixtures of multinomial distributions, affinity propagation, discrete factor analysis, hidden Markov models, Boltzmann machines, restricted Boltzmann machines, autoencoders, convolutional autoencoders, recurrent neural network autoencoders, and vision transformers may be used for unsupervised training.

By way of non-limiting example, information to be provided as input for first machine-learning model 134 and/or second machine-learning model 136 for the purposes of training may include steel mill image information, steel mill video information, encoded information, encoded features, machine state information, and/or other information. Information that is provided as input for first machine-learning model 134 and/or second machine-learning model 136 may be used to construct a hypothesis function to determine the presence of a cobble event. In some embodiments, first machine-learning model 134 and/or second machine-learning model 136 may be configured to determine if the outcome of the hypothesis function was achieved and based on that analysis make a determination with respect to the information upon which the hypothesis function was constructed. That is, the outcome tends to either reinforce the hypothesis function with respect to the information upon which the hypothesis functions were constructed or contradict the hypothesis function with respect to the information upon which the hypothesis function was constructed. In these embodiments, depending on how close the outcome tends to be to an outcome determined by the hypothesis function, first machine learning model 134 and/or second machine learning model 136 may either adopt, adjust, or abandon the hypothesis function with respect to the information upon which the hypothesis function was constructed. As such, machine learning algorithms described herein may dynamically learn through the training phase what characteristics of an input (e.g., image information) are most predictive in determining whether the features of a steel mill image display any cobble event. By way of non-limiting example, the machine learning algorithms may include, but are not limited to, first machine-learning model 134 and/or second machine-learning model 136.

For example, first machine-learning model 134 and/or second machine-learning model 136 may be provided with information on which to train so that it, for example, is able to determine the most salient features of a received steel mill image information to operate on. First machine-learning model 134 and/or second machine-learning model 136 may be trained as to how to analyze the steel mill image information, rather than analyzing the steel mill image information using pre-defined instructions. As such, the machine learning algorithms described herein may dynamically learn through training what characteristics of an input signal are most predictive in determining whether the features of a steel mill image display any abnormality.

In some embodiments, first machine-learning model 134 and/or second machine-learning model 136 may be trained by repeatedly presenting first machine-learning model 134 and/or second machine-learning model 136 with steel mill image. In some embodiments, training may begin when first machine-learning model 134 and/or second machine-learning model 136 are given steel mill image information and asked to determine the presence of a cobble event. The predicted cobble event may then be compared to true cobble event that corresponds to the steel mill image information. An optimization technique such as gradient descent and backpropagation may be used to update the weights in each layer of first machine-learning model 134 and/or second machine-learning model 136 so as to produce closer agreement between the cobble probability predicted by first machine-learning model 134 and/or second machine-learning model 136, and the presence of the cobble. This process may be repeated with new steel mill image information and cobble information until the accuracy of the network has reached the desired level. An optimization technique may be used to update the weights in each layer of first machine-learning model 134 and/or second machine-learning model 136 to produce closer agreement between the cobble event predicted by first machine-learning model 134 and/or second machine-learning model 136, and the true cobble event (or lack thereof). This process may be repeated with new steel mill image information and cobble event information until the accuracy of the network has reached the desired level. An optimization technique is used to update the weights in each layer of first machine-learning model 134 and/or second machine-learning model 136 so as to produce closer agreement between the cobble event probability predicted by first machine-learning model 134 and/or second machine-learning model 136, and the actual cobble event. This process is repeated with new steel mill image information and cobble event information until the accuracy of the network has reached the desired level. Following training with the appropriate cobble event information given above, first machine-learning model 134 and/or second machine-learning model 136 may be configured to analyze a steel mill image or set of images and determine the presence or absence of cobble, the type and location of said cobble event and the conditions associated with such.

In some embodiments of first machine-learning model 134 and/or second machine-learning model 136 described herein, first machine-learning model 134 and/or second machine-learning model 136 may receive steel mill image information and directly determine the cobble probability of the subject. The cobble probability may define the probability that the steel mill image is associated with the cobble event.

In general, a machine learning algorithm is trained using a database of steel mill images and/or encoded information from one or more steel mill images and/or any features or metrics computed from the above said information potentially with the corresponding ground-truth values. Training a machine-learning algorithm may construct a transformation function for predicting probability of a cobble event in steel mill image and/or any features or metrics computed from the above said information. The machine learning algorithm may dynamically learn through training what characteristics of an input image are most predictive in determining whether the features of a steel mill image display any cobble event. A trained machine-learning algorithm or model may use the constructed and optimized transformation function from the training to predict the probability of a cobble event by using the steel mill image information and/or any features or metrics computed from the above said information.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

By way of non-limiting example, some or all of the functionality of system 100 may be performed by one or more edge computing devices or servers, by server(s) 102, and/or by client computing platform(s) 104. In some implementations, server(s) 102 may include the one or more edge computing devices and/or servers. By way of non-limiting example, the one or more edge computing devices and/or servers may be disposed at or near the industrial environment. For example, the one or more edge computing devices and/or servers may enable detection and/or prediction of occurrences of cobble events within the industrial environment at or near real-time. The one or more edge computing devices and/or servers may be in communication with a remote cloud/data center through gateways for downloading and/or transmitting information such as report information (e.g., incident report, information collected from the sensory system, etc.), trained machine-learning models, and/or other information.

Server(s) 102 may be configured by machine-readable instructions 106. Machine-readable instructions 106 may include one or more instruction components. The instruction components may include computer program components. The instruction components may include one or more of image component 108, segmentation component 110, candidate component 112, validation component 114, control signal component 116, and/or other instruction components.

Image component 108 may be configured to receive the image information captured by an image sensor 132. Image sensor 132 may be configured to capture image information 138. Image information 138 may convey a time-ordered series of images of the industrial environment that depict at least one area of the industrial environment through which hot metal is being moved. The images may be captured by one or more cameras disposed throughout the industrial facility. An image may be a frame or still image from a video. The time-ordered series of images may include some or all of the frames from the video. An image may be a red-green-blue (RGB) image, a YUV image, a depth image, a laser-generated image, or an infrared image. An image may depict one or more instances of the industrial process. For example, an image of a factory floor may depict two or more hot rolling processes. By way of non-limiting example, image sensor 132 may be part of a camera. The camera may be a video camera recording a view or views of the industrial environment. Image information 138 may define visual content of individual ones of the time-ordered series of images. In some implementations, image information 138 may be stored and/or transmitted electronically. For example, image information 138 may be stored by non-transitory electronic storage 128.

Segmentation component 110 may be configured to generate segmentation maps for individual ones of the images. The segmentation maps may be generated by a first machine-learning model 134. The individual segmentation maps may indicate the portion or portions of the individual images that depict hot metal moving through the industrial environment. First machine-learning model 134 may be configured to take image information 138 and/or other information as input. First machine-learning model 134 may be configured to generate segmentation maps as output based on the input. In some implementations, the segmentation maps may identify different materials and/or entities within the industrial environment. By way of non-limiting example, the materials and/or entities may be identified by labels for individual segments generated by first machine-learning model 134. In some implementations, the segmentation maps may indicate a level of confidence for each label generated by first machine-learning model 134. For example, the materials and/or entities may include cool metal, hot metal, machinery, workers, and/or other objects within the industrial environment.

In some implementations, first machine-learning model 134 may be configured to perform image segmentation responsive to receipt of image information 138 as input. In some implementations, input to first machine-learning model 134 may include sensor information (e.g., image information, machine state information, temperature, etc.), information from the facility (e.g., product type, product size, product dimension, etc.), and/or other information. In some implementations, first machine-learning model 134 may be configured to perform semantic segmentation, instance segmentation, panoptic segmentation, and/or other types of segmentation algorithms to generate the segmentation maps. First machine-learning model 134 may, in actuality, include one or more machine-learning sub-models or sub-networks. The one or more machine-learning models or networks may be of any type suitable for the task(s) described. For example, first machine-learning model 134 may include one or more of a support vector machine (SVM), a naïve Bayes classification, a linear regression model, a quantile regression model, a logistic regression model, a random forest, a neural network, convolutional neural network (CNN), recurrent neural network (RNN), a gradient-boosted classifier or regressor, or another supervised or unsupervised machine learning algorithm (e.g., generative adversarial network (GAN), Cycle-GAN, etc.). By way of non-limiting example, first machine-learning model 134 may have been trained using image information conveying images of the industrial environment and/or other industrial environments and/or other sensor information.

Segmentation may also comprise using one or a combination of the following techniques: convolution neural networks (e.g., U-Net), threshold methods (e.g., Otsu's threshold and mean shift), region-based methods (e.g., growing or split and merge), edge-based methods (e.g., canny, gradient, or Laplacian), watershed-based methods (e.g., marker controlled watershed), or clustering-based methods (e.g., k-means clustering or fuzzy c-means clustering).

In general, segmentation may include categorizing or grouping particular regions (or "segments" of an image) and associating them with particular labels (e.g., class labels) or masks. Segmentation may, for example, be used to generate a visualization of an image with regions masked or overlaid with different colors corresponding to their particular features. Segmentation may also produce a visualization including regions of an image being surrounded by colored or shaded borders. Segmentation may analyze pixels of the image to perform this grouping.

The system may select a segment of the plurality of segments or a region including a segment or a plurality of segments of the image. The segment may include an object of interest in monitoring the industrial process. The object of interest may be a metal object. The object of interest may be a slab, ingot, sheet, bar or another shape of metal stock or product for processing. The metal may be steel. The segmentation algorithm may apply a mask to the object of interest and/or a region of interest. A region of interest may include an area surrounding the object of interest. Such a region may enable measurement of a deviation of the object from a path. A deviation may be caused by an unexpected traversal of the object away from or out of the path, or by an unexpected deformation of the object. The system may also apply a bounding box to a particular region. The bounding box may be used, at least in part, to predict a potential collision between a plurality of objects of interest.

Candidate component 112 may be configured to identify whether or not individual sets of one or more images depict cobble event candidates. For example, a first set of one or more images may be identified as a cobble event candidate. In some implementations, such identification may be done by analyzing the portion or portions of individual ones of the images indicated by the segmentation maps as depicting hot metal moving through the industrial environment. In some implementations, identifying the first set as a cobble event candidate may include one or more of determining hot metal depicted in individual ones of the first set is located in an unsafe location within the industrial environment based on the first segmentation map, determining hot metal depicted in individual ones of the first set forms a protuberance based on the first segmentation map, and/or making other determinations. In some implementations, identifying the first set as a cobble event candidate may include determining a probability that the first set depicts a cobble event using first machine-learning model 134 is above a particular threshold. By way of non-limiting example, of non-limiting example, such determinations may be made by first machine-learning model 134. In some implementations, determining hot metal forms a protuberance may include using morphology algorithms for detection of the protuberance. For example, determining whether the hot metal forms a protuberance may include using erosion. Hot metal forming a protuberance may include the hot metal forming a blob, a knot, a loop, and/or another non-uniform shape. For example, the cobble event candidates may be identified using rule-based inference.

In some implementations, the identification of the cobble event candidates may be based on individual still images. In some implementations, the identification of the cobble event candidates may be sensitive in order to detect potential cobble event candidates. The identification being sensitive may include identifying an image depicting hot metal in a small, local unsafe area as a cobble event candidate. The identification being sensitive may include identifying an image depicting hot metal forming a small blob or not as a cobble event candidate. The identification of the cobble event candidates may be sensitive to minimize risk of missing potential cobble events and/or to detect occurrence of cobble events early. By way of non-limiting example, due to the sensitivity, individual ones of cobble event candidates may be false positives.

Figure 4:
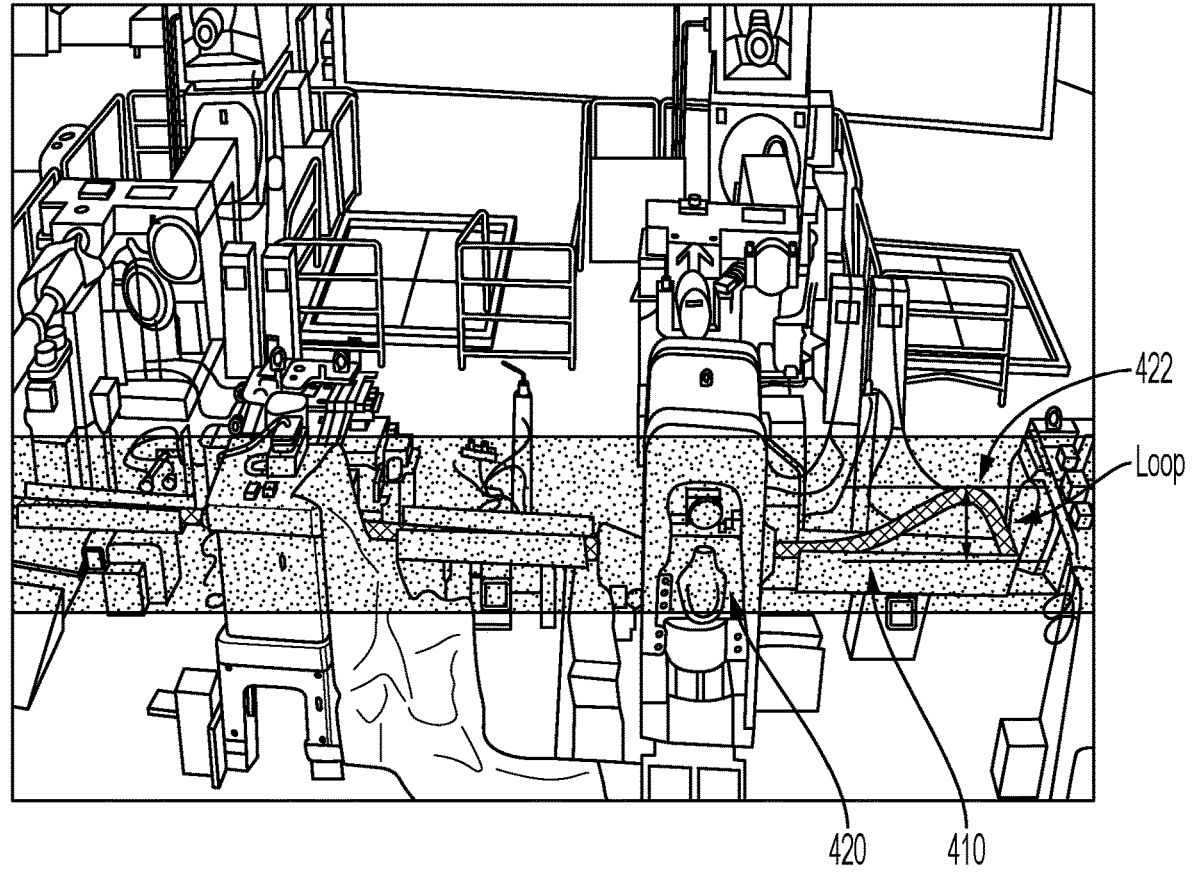
FIG. 4 illustrates a view of an industrial environment during a cobble event, in accordance with some implementations.

FIG. 4 illustrates a view of an industrial environment 400 during a cobble event. Hot metal 422 may be transported through industrial environment 400 on roller path 420. Loop 410 may be indicative of the cobble event occurring. By way of non-limiting example, an image depicting loop 410 may be identified as a cobble event candidate by first machine-learning model 134 (shown in FIG. 1).

Figure 5:
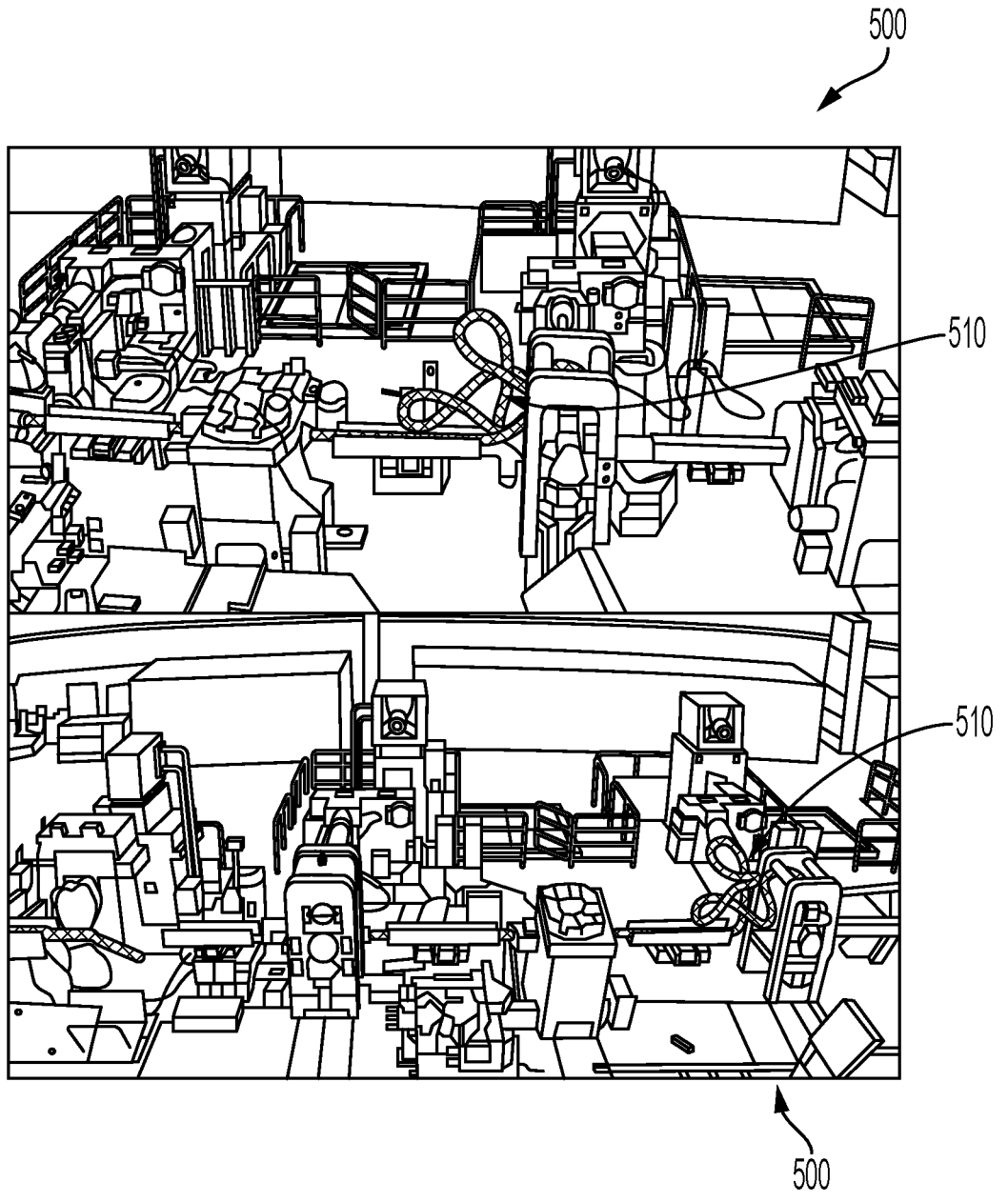
FIG. 5 illustrates views of an industrial environment during a cobble event, in accordance with some implementations.

FIG. 5 illustrates a view of an industrial environment 500 during a cobble event. Hot metal 510 may have formed a knot while being transported through industrial environment 500. Hot metal 510 may be determined to be in an unsafe area due to hot metal 510 deviating from its path. Additionally, hot metal 510 may be determined to form a protuberance due to its looped form.

Figure 6:
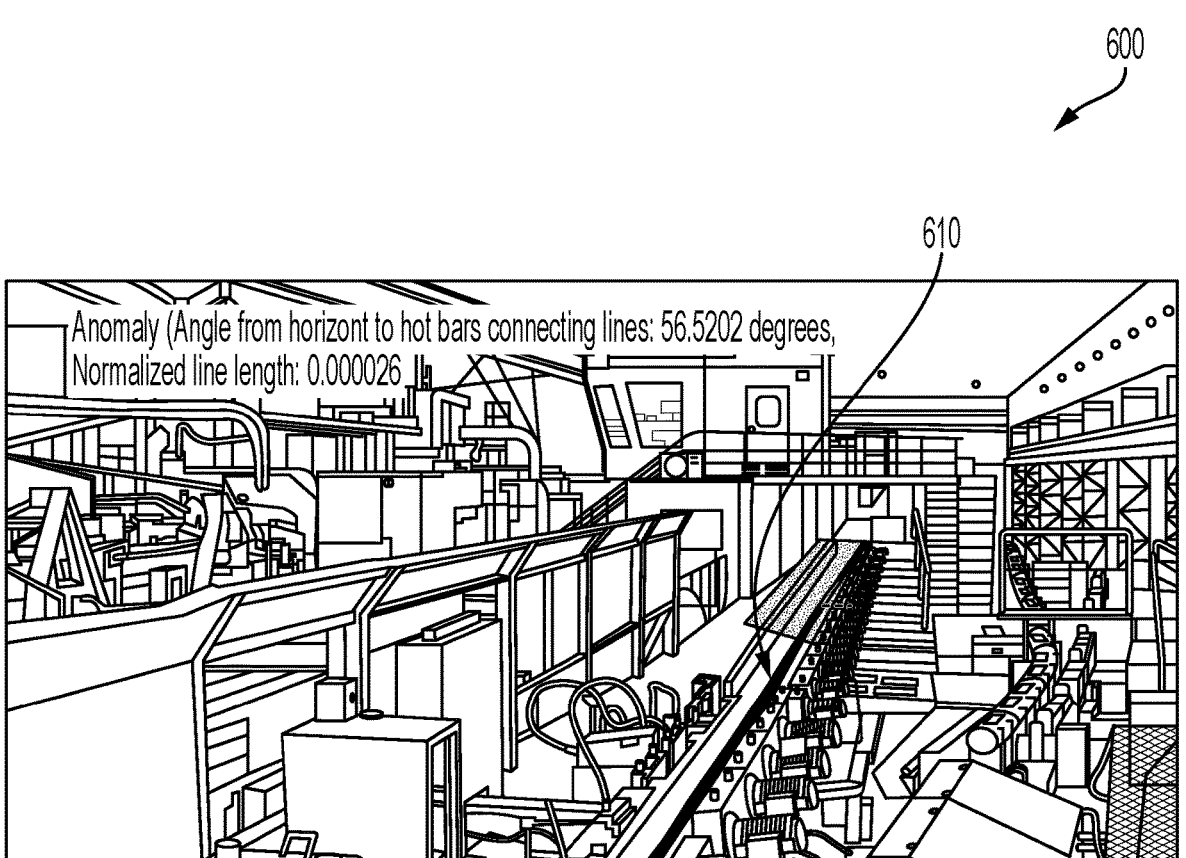
FIG. 6 illustrates a view of an industrial environment during a potential cobble event, in accordance with some implementations.

FIG. 6 illustrates a view of an industrial environment 600 during a potential cobble event 610. Potential cobble event 610 may become an actual cobble event if two hot metal bars (shown in the center) collide. For example, the two hot metal bars may collide when not directly aligned with one another (i.e., at an angle greater than 0 degrees). By way of non-limiting example, potential cobble event 610 may have been identified as a cobble event candidate due to the two metal bars being at an angle of 56 degrees from one another.

Figure 7:
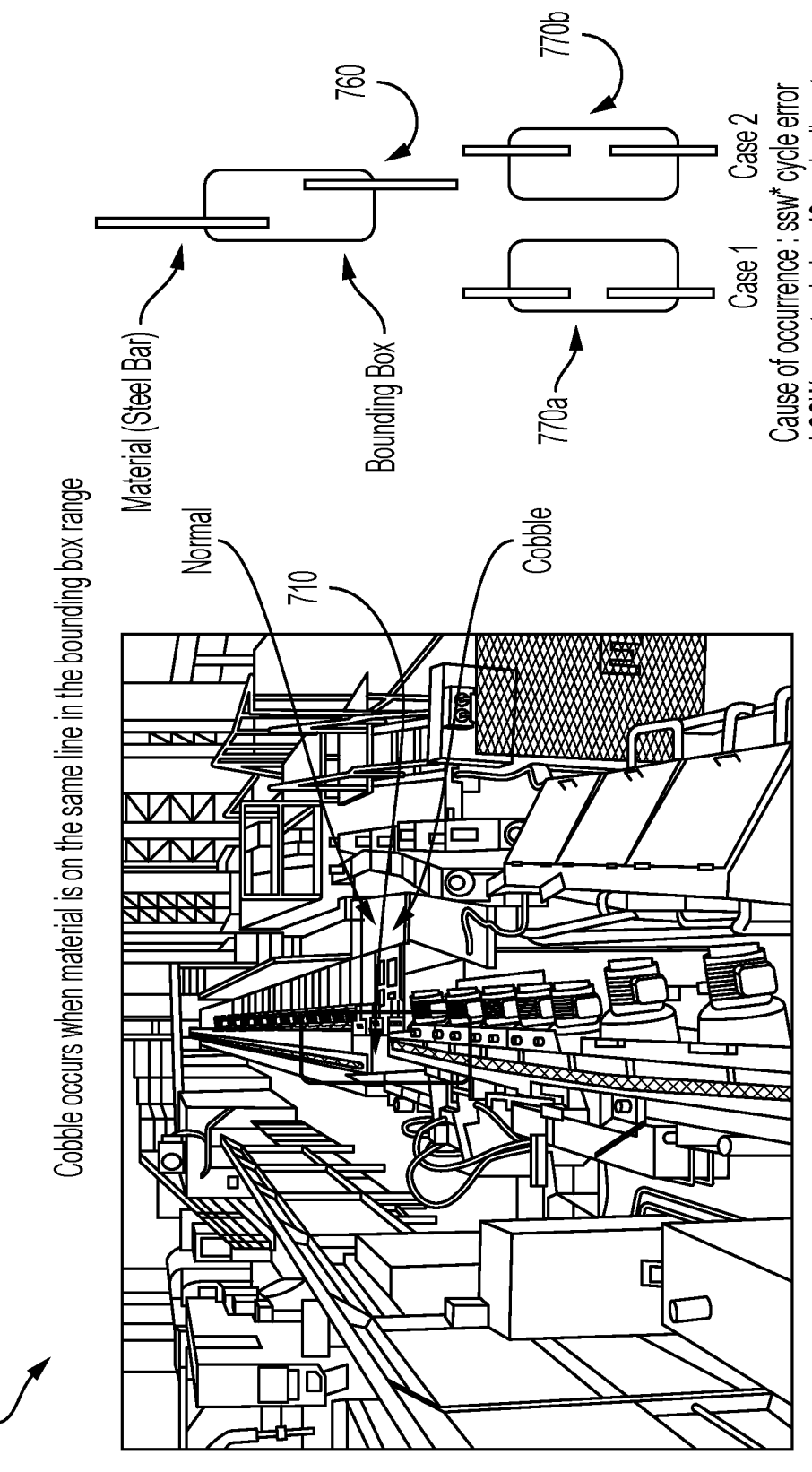
FIG. 7 illustrates a view of an industrial environment during normal operation, in accordance with some implementations.

FIG. 7 illustrates a view of an industrial environment 700 during normal operation. Hot metal 710 may be in normal operation due to the two hot metal bars shown travelling at an angle respective to each other despite being presently in line with each other along the same path. However, view of the industrial environment 700 may be identified as a cobble event candidate due to the two hot metal bars being in line with each other at the time view 700 was captured. As such, view of the industrial environment 700 may be a false positive cobble event candidate. FIG. 7 may illustrate potential occurrences for hot metal travelling in an industrial environment. For example, occurrence 760 may illustrate a normal event in the industrial environment. Occurrence 760 may be normal by virtue of two hot metal bars travelling along different lines. Occurrence 770a and occurrence 770b may be cobble events due to two hot metal bars travelling along the same line toward each other.

Referring back to FIG. 1, validation component 114 may be configured to provide individual series of one or more images as input to a second machine-learning model 136. By way of non-limiting example, any determinations, identifications, classifications, and/or other steps regarding an individual series of images may be considered to regard individual images included in the individual series. In some implementations, an individual series may include a set of one or more images identified as a cobble event candidate. By way of non-limiting example, a first series including the first set may be provided as input to the second machine-learning model. Providing the first series as input may be responsive to identification of the first set as depicting a cobble event candidate. Second machine-learning model 136 may be configured to determine whether the individual input series depict actual cobble events or are false positives. For example, the first series may be determined to be an actual cobble event.

In some implementations, second machine-learning model 136 may perform image classification on an area or areas of individual image(s) included in the individual series. The area(s) may include the portion(s) of the image(s) included in the individual series indicated by the segmentation map to be depicting hot metal moving through the industrial environment. By way of non-limiting example, the area(s) may include portion(s) of the image(s) included in the first series indicated by the segmentation map to be depicting hot metal moving through the industrial environment. The image classification performed by second machine-learning model 136 may indicate whether the image(s) included in the individual series depict an actual cobble event or a false positive. In some implementations, the area(s) may include a wall or walls containing hot metal moving through the industrial environment. For example, the wall(s) may be solid or not solid. For example, the wall(s) may be chain link, mesh, a fence, and/or in another form. In some implementations, the wall(s) may surround hot metal moving through the industrial environment such that movement of the hot metal is restricted.

By way of non-limiting example, the area(s) may be classified as including normal metal, including cobbled metal, including no metal, and/or another classification. For example, an area classified as including normal metal may be determined to be functioning as expected. For example, an area classified as including cobbled metal may be determined to have metal in an unsafe or unexpected area or location. In some implementations, hot metal may be determined to be in an unsafe or unexpected area or location. An area apart from an intended pathway for the hot metal may be an unsafe or unexpected area or location for the hot metal. In some implementations, an area classified as including cobbled metal may be determined to have metal in an unsafe or unexpected form. For example, the unsafe or unexpected form may include a loop, a knob, a protuberance, and/or another form. For example, an area classified as including no metal may be determined to not contain hot metal and/or to only contain metal machinery or equipment.

By way of non-limiting example, an individual series may be a time-ordered series. By virtue of being time-ordered series, the individual series may be a video recording. In some implementations, second machine-learning model 136 may perform video classification on the time-ordered series of images to determine whether the individual series depicts an actual cobble event or a false positive. By way of non-limiting example, determining an individual series depicts an actual cobble event may include determining the images depict a potential and/or impending cobble event. By way of non-limiting example, second machine-learning model 136 may use a video classification neural network and/or another machine-learning architecture. By way of non-limiting example, the first series and segmentation maps for individual images of the first series may be provided to second machine-learning model 136 as input. Providing an image as input to second machine-learning model 136 may include providing image information 138 defining visual content of the image as input. In some implementations, determining an individual series depicts an actual cobble event may include second machine-learning model 136 classifying at least one of the images included in the individual series as depicting cobbled metal. The video classification may be performed on a video of any length and/or any frame rate. For example, the video classification may be performed on a 10-20 frame video that was recorded at 30 frames per second.

In some implementations, second machine-learning model 136 may be a trained machine-learning model and/or may be trained using a machine-learning model. In some implementations, second machine-learning model 136 may be stored in and/or by non-transitory electronic storage 128. In some implementations, second machine-learning model 136 may be configured to use the segmentation maps generated by first machine-learning model 134 as part of its input. Second machine-learning model 136 may, in actuality, include one more machine-learning models or networks. The one or more machine-learning models or networks may be of any type suitable for the task(s) described. For example, second machine-learning model 136 may include one or more of a support vector machine (SVM), a naïve Bayes classification, a linear regression model, a quantile regression model, a logistic regression model, a random forest, a neural network, convolutional neural network (CNN), recurrent neural network (RNN), a gradient-boosted classifier or regressor, or another supervised or unsupervised machine learning algorithm (e.g., vision transformers, generative adversarial network (GAN), Cycle-GAN, etc.). By way of non-limiting example, second machine-learning model 136 may have been trained using image information conveying images of the industrial environment and/or other industrial environments and/or other sensor information.

Control signal component 116 may be configured to generate control signals for one or more pieces of equipment present in the industrial environment. By way of non-limiting example, the control signals may cause the one or more pieces of equipment to modify operation to remediate the actual cobble event and/or provide notification of the actual cobble event. By way of non-limiting example, the control signals may be generated responsive to determining the first series depicts an actual cobble event. The controller may generate an alert for an operator or pause, cancel, or completely or partially reverse the industrial process. For example, upon detection of a cobble event, workers may be immediately notified via haptic feedback on their personal alert device (e.g., wearable device, mobile tag device, etc.). Alert video and metadata may be simultaneously sent to a safety manager portal of the management console for post-event analysis and coaching. Control signal component 116 may be configured to generate and deliver continuous safety information to help recognize improvements in worker behavior, operations management, maintenance of devices, and/or other aspects of the industrial environment to applications running on an edge computing server and on the cloud.

In some cases, control signals/commands to one or more imaging devices disposed within the industrial environment may be generated. The control signals/commands may be transmitted to a selected imaging device to adjust one or more imaging acquisition parameters of the imaging device (e.g., zoom factor, spatial resolution, frame rate, exposure time, pan and tilt, etc.).

In some cases, the control signals/commands may control the operation of a camera (e.g., taking still or moving pictures, zooming in or out, zoom level, turning on or off, switching imaging modes, changing image resolution, adjusting focus, changing depth of field, changing exposure time, changing viewing angle or field of view). As an example, the control signals/commands may control an optical assembly of a selected imaging device to achieve a desired zoom level in a region of interest. The optical assembly may include components that are useful for adjusting a light path, line of sight, field of view and the like. For instance, the optical assembly may include zoom lens for which the focal length or angle of view can be varied. The imaging device may provide optical zoom by adjusting focal length of the zoom lens. For instance, one or more lenses may slide along an optical axis to adjust a focal length such that a designed zoom level or magnification level can be achieved. The focal length may be increased when zooming in, and the focal length may be decreased when zooming out. The focal length may be adjusted by moving the one or more lenses along the optical axis relative to an imaging sensor. The focal length may be adjusted by moving the imaging sensor along the optical axis relative to the one or more lenses. The focal length may be adjusted by moving both the imaging sensor and the one or more lenses such that a distance between imaging sensor and the lenses is adjusted. In another example, the control signals/commands may control of the pan, tilt angle of camera to track an object of interest. For instance, the camera may be mounted to a movable support such that a line of sight or orientation of the camera can be controlled by actuating the support.

In some implementations, control signal component 116 may be configured to transmit the control signals to the one or more pieces of equipment. In some implementations, the control signal may be provided to a controller or a device (e.g., an integrated programmable logic controller (PLC)) that controls one or more pieces of industrial equipment. The controller may cause one or more pieces of equipment to cancel, reverse, or pause the industrial process.

For example, the control signal may include instructions to reduce the thickness of molten steel (e.g., steel bars). For example, transmitting the control signal may include delivering interventions to the associated individual or control signals to an equipment. For instance, the interventions may include the control signals to an equipment may include a command to shut down or change a machine state of the equipment to avoid collision or other hazardous events. For example, the control signals may be delivered through a machine's or an equipment's programmable logic controller (PLC)

The PLC may receive a prediction or detection of and provide one or more signals to various steel mill control equipment. It may be a computer that is directly or remotely connected but communicatively coupled to steel mill equipment. For example, the PLC may cause the rollers to stop. In another example, a PLC control command may be generated by the algorithm to turn on a cutting machine where the cutting machine may be operated to remove the upcoming products thereby preventing accumulating the cobble incidents In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 110, 112, 114, 116, and/or other components. Processor(s) 136 may be configured to execute components 108, 110, 112, 114, 116, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and 116 are illustrated in FIG. 1 as being implemented within a single processing unit, in implementations in which processor(s) 136 includes multiple processing units, one or more of components 108, 110, 112, 114, and 116 may be implemented remotely from the other components. The description of the functionality provided by the different components 108, 110, 112, 114, and 116 described below is for illustrative purposes, and is not intended to be limiting, as any of components 108, 110, 112, 114, and 116 may provide more or less functionality than is described. For example, one or more of components 108, 110, 112, 114, and 116 may be eliminated, and some or all of its functionality may be provided by other ones of components 108, 110, 112, 114, and 116. As another example, processor(s) 136 may be configured to execute one or more additional components that may perform some or all of the functionality attributed below to one of components 108, 110, 112, 114, and 116.

Figure 3:
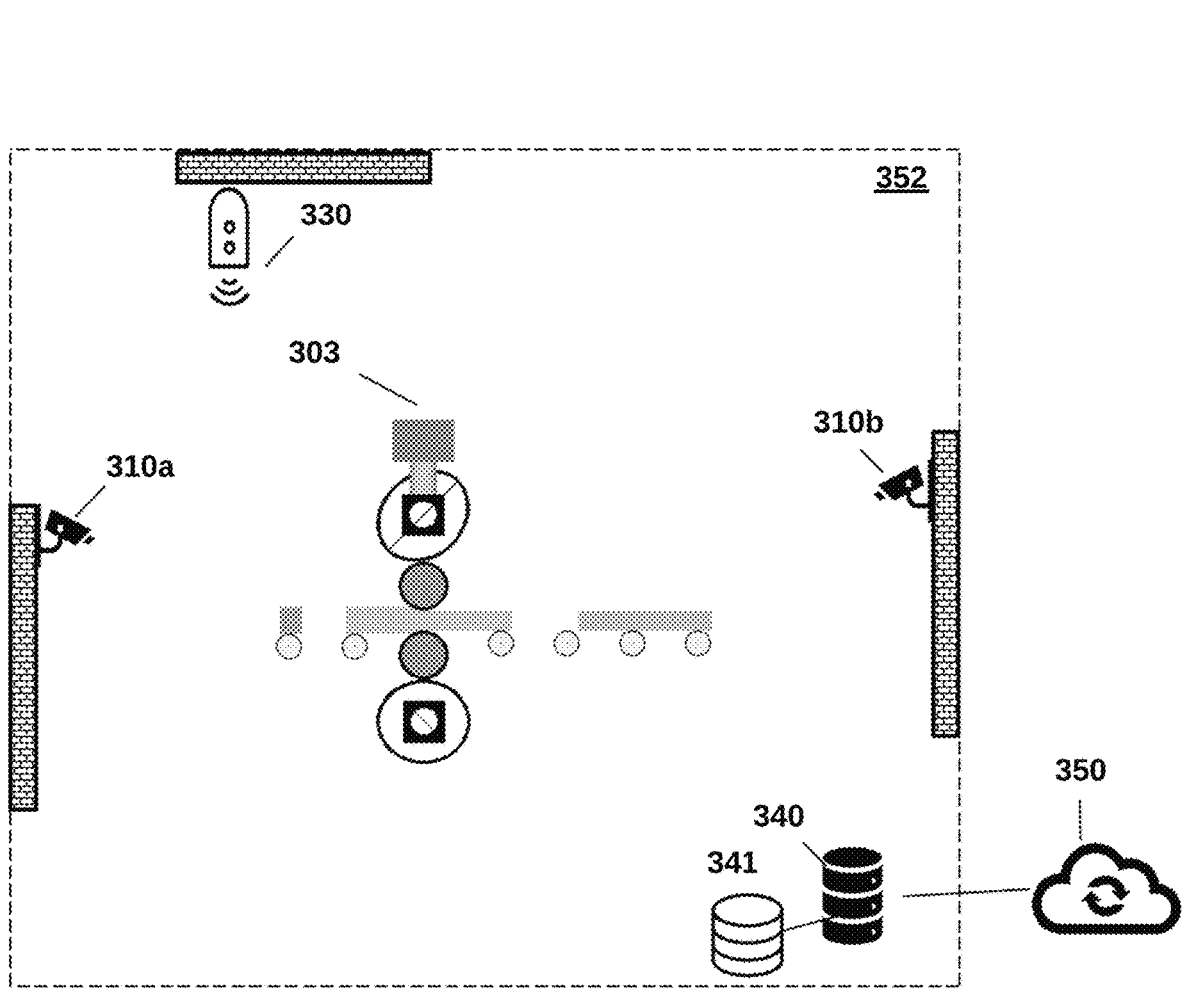
FIG. 3 illustrates an industrial monitoring system implemented in an industrial environment, in accordance with some implementations.

FIG. 3 illustrates an industrial monitoring system 300 implemented in an industrial environment 352. Industrial environment 352 may be, for example, a steel mill, and the monitoring system may predict or detect cobble events. Monitoring system 300 may include a set of connected devices, an edge gateway (e.g., edge computing device/server) 340 for processing information collected from a camera 310*a*, a camera 310*b*, and a sensor 130 and for providing real-time feedback to a user (e.g., onsite manager). Monitoring system 300 may include a backend management system 350 (e.g., cloud server).

In some embodiments of the present disclosure, monitoring system 300 may employ an edge intelligence paradigm such that data processing and prediction/inference is performed at the edge or edge gateway 340. In some implementations, first machine-learning model 134 and/or second machine-learning model 136 (depicted in FIG. 1 and described herein) may be built, developed, and trained on backend management system 350 residing on a cloud/data center. first machine-learning model 134 and/or second machine-learning model 136 may be run on a user device (e.g., hardware accelerator) deployed at industrial environment 352 and/or edge computing device 340 for inference. For instance, information may be sent to the on-site edge computing device 340 in real-time or near real-time for managing on-site operations, safety and risk within an industrial site. For example, a message package including batch data may be sent to a remote management console or the cloud at a lower frequency for post-event analysis. In some instances, the edge computing device may implement an adaptive framework to fuse different types of sensor information. For instance, computer vision information may be fused dynamically with real-time locating system (RTLS) information to monitor moving speed, orientation, location of an object and detect safety conditions.

In some cases, at least part of industrial environment 352 may be a hazardous worksite such as a steel mill. In some situations, a part or parts of industrial environment 352 may be facilitated with local area network but may have limited wireless Internet or cellular network access particularly when the worksite is in a remote area that is remote from a wide area network ("WAN") or an inter-network (e.g., the Internet), or when part or parts of industrial environment 352 is a temporary or dynamic worksite without sufficient network coverage. Industrial environment 352 may have indoor and outdoor areas or work/safety zones where operations, tasks and duties are performed.

In some embodiments, camera 310*a*, camera 310*b*, and/or another sensor deployed within industrial environment 352 may be used to generate infrared images (e.g., from thermal cameras) for analysis. Temperature information from the infrared images may beneficially allow for tracking hot bars for cobble detection. In some cases, the adaptive fusion network may fuse the thermal images with visible (RGB) images for cobble detection. For instance, RGB and thermal images may be fused in a semantic segmentation model or a classification model for detecting cobble event or predicting an impeding cobble event. A convolutional neural network (CNN) may be employed to automatically identify occurrence of a cobble event or unmet normal conditions (e.g., alignment of two hot bars) that can result in a future cobble event. The model may use a thermal and RGB encoder to combine the features detected from both spectrums to improve its performance of the model, and a single classifier to predict the classes. For example, the fusion network architecture may include an RGB encoder, a parallel thermal encoder, and a single decoder followed by a classification prediction. The encoders produce low-resolution feature maps for the RGB image and the thermal image, and the decoder up-samples the features to develop dense feature maps. The features acquired from each layer within the thermal decoder may be mapped to the corresponding layer within the RGB encoder, as part of the fusion process. The encoder may be based on any CNN-based architecture like the Residual Network (ResNet), which can be varied based on the number of layers.

In some cases, pre-processing of the visible (RGB) image and the thermal image may be conducted. For instance, the visible image and the thermal image may be aligned such as by zero-padding the thermal image to match the image size with the RGB image (which usually has higher resolution).

Camera 310*a*, camera 310*b*, and/or other imaging devices may be deployed on stationary structures, such as the walls of the building, or on mobile equipment, such as cranes and vehicles. In some cases, the imaging device may be a video camera. The camera may include optical elements, image sensors, and/or other components for capturing image information. The image sensors may be configured to generate image information in response to wavelengths of captured light. A variety of image sensors may be employed for capturing image information such as complementary metal oxide semiconductor (CMOS) or charge-coupled device (CCD). In some cases, the image sensor may be provided on a circuit board. The circuit board may be a printed circuit board (PCB). The PCB may include a plurality of electronic elements for processing the image signal. For instance, the circuit for a CMOS sensor may include A/D converters and amplifiers to amplify and convert the analog signal provided by the CMOS sensor. Optionally, the image sensor may be integrated with amplifiers and converters to convert an analog signal to a digital signal such that a circuit board may not be required to perform the conversion. In some cases, the output of the image sensor or the circuit board may be image information (digital signals) that can be further processed by a camera circuit or processors of the camera. In some cases, the image sensor may include an array of optical sensors. By way of non-limiting example, the image information may be the same as or similar to image information 138 (shown in FIG. 1 and described herein).

In some cases, camera 310*a*, camera 310*b*, and/or another camera may be a plenoptic camera having a main lens and additional micro lens array (MLA). The plenoptic camera model may be used to calculate a depth map of the captured image information. In some cases, the image information captured by camera 310*a*, camera 310*b*, and/or another camera may be grayscale image with depth information at each pixel coordinate (i.e., depth map). Camera 310*a*, camera 310*b*, and/or another camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement. The depth measurement may then be used for generating a three-dimensional scene map and may be complemented by information provided by a real-time locating system (RTLS) component and a light detecting and ranging (LIDAR) system.

As described above, camera 310*a*, camera 310*b*, and/or another camera may perform pre-processing of the capture image information. In some implementations, the pre-processing algorithm may include image processing algorithms.

For example, the image processing algorithms may include image smoothing, to mitigate the effect of sensor noise from an image sensor. For example, the image processing algorithms may include image histogram equalization to enhance the pixel intensity values. In some cases, one or more processors of camera 310*a*, camera 310*b*, and/or another processor may use optical approaches as described elsewhere herein to generate a depth map of the industrial environment 352. For instance, an application programming interface (API) of camera 310*a*, camera 310*b*, and/or another processor may output a focused image with depth map. Alternatively, the depth map may be generated by a safety inference engine of the system by fusing LIDAR information and image information.

Monitoring system may include a light detection and ranging (LIDAR) system 330. LIDAR system 330 may obtain three-dimensional information of the target scene by measuring distances to objects. LIDAR system 330 may include one or more LIDAR devices deployed throughout the worksite. The emitter of a LIDAR device may generate a sequence of light pulses emitted within short time durations such that the sequence of light pulses may be used to derive a distance measurement point. The LIDAR system 330 may provide three-dimensional (3D) imaging (e.g., 3D point cloud) or further analysis (e.g., obstacles detection).

LIDAR system 330 may include one or more LIDAR devices deployed to any suitable locations within the industrial environment 300. LIDAR system 330 may generate 3D point cloud information and/or analysis result (e.g., detection of an obstacle, detection of a collision, etc.). In some cases, LIDAR system 330 may be configured to detect changes in the target scene (e.g., construction site) that may be relevant to safety of the workspace. For example, the changes detected by LIDAR system 330 may include new structures getting erected or taken down (i.e., construction progress), equipment installed or removed, materials delivered or removed from the scene, and other changes. Dynamic tracking of changes of the target scene may be utilized to estimate the precise location of workers in the target scene and the proximity between objects.

As mentioned above, monitoring system 352 may employ an edge intelligence paradigm that data processing and inference is performed at the edge or edge computing server 340 (e.g., on-site server) while the predictive models may be built, developed and trained on a cloud/data center 350, and run on the edge computing server 340, user device such as dashboard tablet for onsite managers (e.g., hardware accelerator), personnel device (e.g., wearable device, mobile tag device) for inference.

Figure 2:
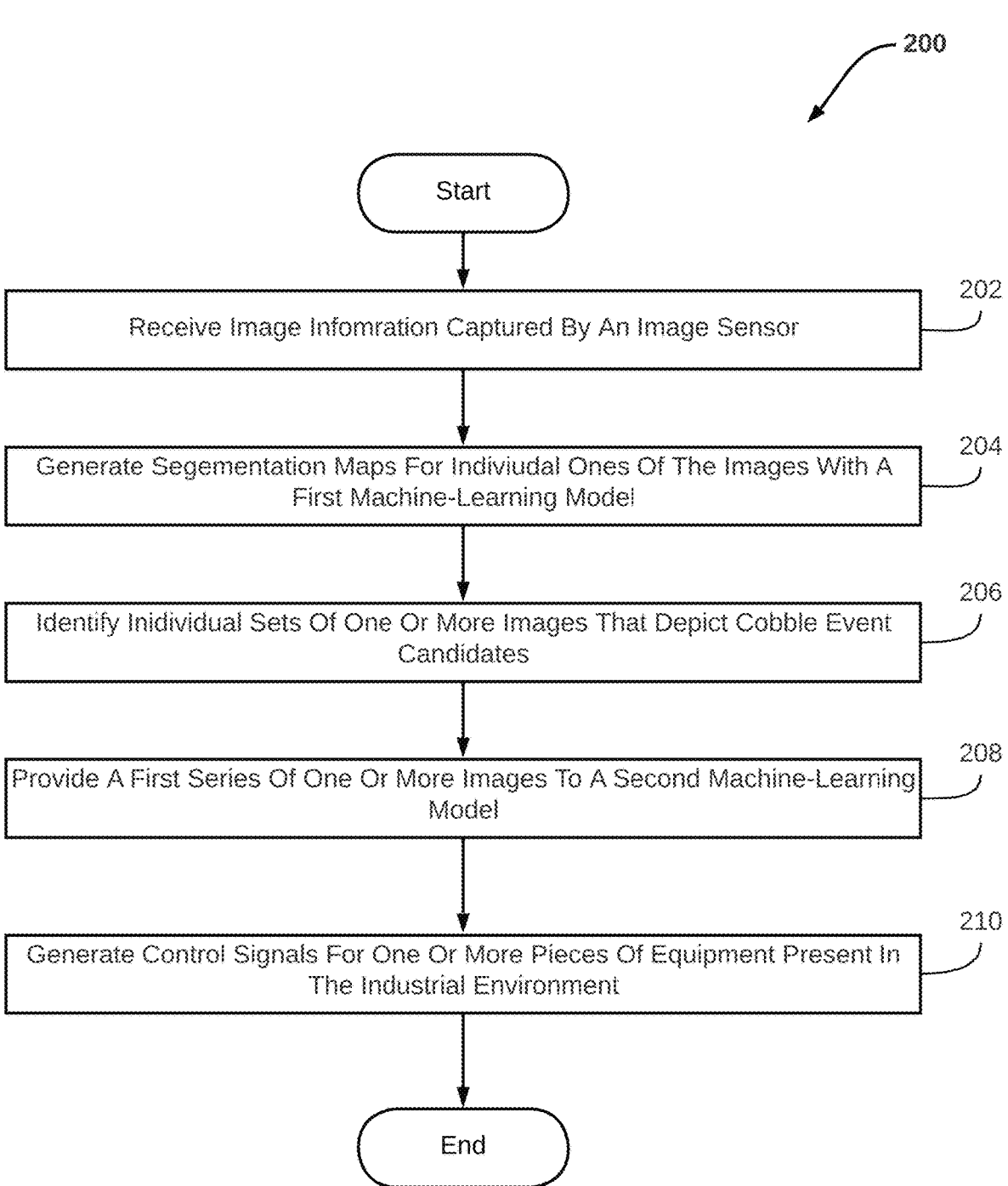
FIG. 2 illustrates a method of detecting and predicting occurrences of cobble events in an industrial environment in which hot metal is being processed.

FIG. 2 illustrates a method 200 to personalize offers for presentation to users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving image information captured by an image sensor. The image sensor may be configured to capture image information conveying a time-ordered series of images of the industrial environment that depict at least one area of the industrial environment through which hot metal is being moved. Operation 202 may be performed by one or more hardware processors configured by machine-readable instructions including a component that is the same as or similar to image component 108, in accordance with one or more implementations.

An operation 204 may include generating segmentation maps for individual ones of the images with a first machine-learning model. The individual segmentation maps may indicate the portion or portions of the individual images that depict hot metal moving through the industrial environment. Operation 204 may be performed by one or more hardware processors configured by machine-readable instructions including a component that is the same as or similar to segmentation component 110, in accordance with one or more implementations.

An operation 206 may include identifying individual sets of one or more images that depict cobble event candidates by analyzing the portion or portions of the images indicated by the segmentation maps as depicting hot metal moving through the industrial environment. By way of non-limiting example, a first set of one or more images may be identified as a cobble event candidate. Operation 206 may be performed by one or more hardware processors configured by machine-readable instructions including a component that is the same as or similar to candidate component 112, in accordance with one or more implementations.

An operation 208 may include providing a first series of one or more images including the first set as input to a second machine-learning model. The first series including the first set may include the first series including the image(s) included in the first set. The second machine-learning model may be configured to determine whether the first series depicts an actual cobble event or is a false positive. By way of non-limiting example, the first series may be determined to be an actual cobble event. In some implementations, operation 208 may be performed responsive to identification of the first set as depicting a first cobble event candidate. Operation 208 may be performed by one or more hardware processors configured by machine-readable instructions including a component that is the same as or similar to validation component 114, in accordance with one or more implementations.

An operation 210 may include generating control signals for one or more pieces of equipment present in the industrial environment that cause the one or more pieces of equipment to modify operation to remediate the actual cobble event and/or provide notification of the actual cobble event. Operation 210 may be performed responsive to determining the first series depicts an actual cobble event. Operation 210 may be performed by one or more hardware processors configured by machine-readable instructions including a component that is the same as or similar to control signal component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to detect and predict occurrences of cobble events in an industrial environment in which hot metal is being processed, the system comprising:
    an image sensor configured to capture image information conveying a time-ordered series of images of the industrial environment that depict at least one area of the industrial environment through which hot metal is being moved; and
    one or more hardware processors configured by machine-readable instructions to:
        receive the image information captured by the image sensor;
        generate segmentation maps for individual ones of the images with a first machine-learning model, wherein the individual segmentation maps indicate the portion or portions of the individual images that depict hot metal moving through the industrial environment;
        identify individual sets of one or more images that depict cobble event candidates such that a first set of one or more images is identified as a cobble event candidate, wherein the individual sets are identified by analyzing the portion or portions of the individual images indicated by the segmentation maps as depicting hot metal moving through the industrial environment;
        responsive to identification of the first set of one or more images as a cobble event candidate, provide a first series of one or more images to a second machine-learning model configured to determine whether the first series of one or more images depicts an actual cobble event or a false positive, wherein the first series of one or more images includes the first set of one or more images; and
        responsive to determining the first series of one or more images depicts an actual cobble event, generate control signals for one or more pieces of equipment present in the industrial environment that cause the one or more pieces of equipment to modify operation to remediate the actual cobble event and/or provide notification of the actual cobble event.

2. The system of claim 1, wherein the one or more hardware processors are configured by machine-readable instructions such that the second machine-learning model performs image classification on an area or areas of images included in the first series of one or more images that include the portion or portions of the images included in the first series of one or more images that are indicated by the segmentation maps for the images included in the first series of one or more images to be depicting hot metal moving through the industrial environment, and wherein the image classification performed by the second machine-learning model indicates whether the first series of one or more images depicts an actual cobble event or a false positive.

3. The system of claim 2, wherein the area or areas of the image include a wall or walls containing hot metal moving through the industrial environment.

4. The system of claim 2, wherein the area or areas of the image are classified as including normal metal, including cobbled metal, or including no metal.

5. The system of claim 1,
    wherein the first series of one or more images is a time-ordered series of images, wherein the first series of one or more images and segmentation maps for individual images of the first series of one or more images are provided as input to the second machine learning model.

6. The system of claim 5,
    wherein the second machine-learning model performs video classification on at least the first series of one or more images to determine whether the first series of one or more images depicts an actual cobble event or a false positive.

7. The system of claim 6,
    wherein determining the first series of one or more images depicts an actual cobble event includes the second machine-learning model classifying the first series of one or more images as depicting cobbled hot metal or not.

8. The system of claim 1, wherein the first machine-learning model performs image segmentation to generate the segmentation maps.

9. The system of claim 1, wherein the control signal causes the one or more pieces of equipment to stop operation.

10. The system of claim 1, wherein identifying the first set as a cobble event candidate includes one or more of determining hot metal depicted in the images included in the first set is located in an unsafe location within the industrial environment based on the segmentation maps and/or determining hot metal depicted in the images included in the first set form a protuberance based on the segmentation maps.

11. A method for detecting and predicting occurrences of cobble events in an industrial environment in which hot metal is being processed, the method comprising:
    receiving image information captured by an image sensor, the image sensor being configured to capture image information conveying a time-ordered series of images of the industrial environment that depict at least one area of the industrial environment through which hot metal is being moved;
    generating segmentation maps for individual ones of the images with a first machine-learning model, wherein the individual segmentation maps indicate the portion or portions of the individual images that depict hot metal moving through the industrial environment;
    identifying individual sets of one or more images that depict cobble event candidates such that a first set of one or more images is identified as a cobble event candidate, wherein the individual sets are identified by analyzing the portion or portions of the individual images indicated by the segmentation maps as depicting hot metal moving through the industrial environment;
    responsive to identification of the first set of one or more images as a cobble event candidate, providing a first series of one or more images to a second machine-learning model configured to determine whether the first series of one or more images depicts an actual cobble event or a false positive, wherein the first series of one or more images includes the first set of one or more images; and responsive to determining the first series of one or more images depicts an actual cobble event, generating control signals for one or more pieces of equipment present in the industrial environment that cause the one or more pieces of equipment to modify operation to remediate the actual cobble event and/or provide notification of the actual cobble event.

12. The method of claim 11, wherein the one or more hardware processors are configured by machine-readable instructions such that the second machine-learning model performs image classification on an area or areas of images included in the first series of one or more images that include the portion or portions of the images included in the first series of one or more images that are indicated by the segmentation maps for the images included in the first series of one or more images to be depicting hot metal moving through the industrial environment, and wherein the image classification performed by the second machine-learning model indicates whether the first series of one or more images depicts an actual cobble event or a false positive.

13. The method of claim 12, wherein the area or areas of the image include a wall or walls containing hot metal moving through the industrial environment.

14. The method of claim 12, wherein the area or areas of the image are classified as including normal metal, including cobbled metal, or including no metal.

15. The method of claim 11,
wherein the first series is a time-ordered series of images, wherein the first series of one or more images and segmentation maps for individual images of the first series of one or more images are provided as input to the second machine-learning model.

16. The method of claim 15,
wherein the second machine-learning model performs video classification on at least the first series of one or more images to determine whether the first series of one or more images depicts an actual cobble event or a false positive.

17. The method of claim 16,
wherein determining the first series of one or more images depicts an actual cobble event includes the second machine-learning model classifying the first series of one or more images as depicting cobbled hot metal or not.

18. The method of claim 11, wherein the first machine learning model performs image segmentation to generate the segmentation maps.

19. The method of claim 11, wherein the control signal causes the one or more pieces of equipment to stop operation.

20. The method of claim 11, wherein identifying the first set as a cobble event candidate includes one or more of determining hot metal depicted in the images included in the first set is located in an unsafe location within the industrial environment based on the segmentation maps and/or determining hot metal depicted in the images included in the first set form a protuberance based on the segmentation maps.

*    *    *    *    *